(12) United States Patent
Mori

(10) Patent No.: US 6,288,700 B1
(45) Date of Patent: *Sep. 11, 2001

(54) LIGHT EMITTING FLAT PANEL DEVICE WHICH USES LIGHT GUIDE ROUTES TO DIRECTLY SEND LIGHT INTO A MATRIX OF ELECTRONIC SHUTTERS

(76) Inventor: Hiroki Mori, 2795-17, 6-chome, Higashi-sayamagaoka, Tokorozawa-City, Saitama-Pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/434,516

(22) Filed: May 4, 1995

(30) Foreign Application Priority Data

May 9, 1994 (JP) .................................... 6-130770

(51) Int. Cl.[7] ................. G09G 3/36; G08B 5/00; G02B 6/06; F21V 7/04
(52) U.S. Cl. .............. 345/102; 340/815.42; 385/116; 362/31; 349/62
(58) Field of Search ................. 345/102, 32, 31, 345/55, 108; 340/815.42, 815.55, 815.56, 815.57, 815.75, 815.43; 362/31, 26, 32, 27, 293, 346; 359/42; 40/547; 349/62, 61, 63, 65; 385/50, 116, 123, 124, 147; 348/197, 195

(56) References Cited

U.S. PATENT DOCUMENTS

| | | | |
|---|---|---|---|
| 3,871,747 | * | 3/1975 | Andrews .................... 385/147 |
| 3,962,702 | * | 6/1976 | Kriege .................... 340/815.43 |
| 4,378,956 | * | 4/1983 | Lester .................... 340/815.42 |
| 4,573,766 | * | 3/1986 | Bournay, Jr. et al. .......... 345/102 |
| 4,578,709 | * | 3/1986 | Lang et al. ................... 348/197 |
| 4,640,592 | * | 2/1987 | Nishimura et al. ............. 385/125 |
| 4,911,527 | * | 3/1990 | Garcia, Jr. et al. ............ 385/50 |
| 4,929,048 | * | 5/1990 | Cuypers ...................... 385/116 |
| 4,978,952 | * | 12/1990 | Irwin ........................ 345/102 |
| 5,008,658 | * | 4/1991 | Russay et al. ................ 345/102 |
| 5,018,007 | * | 5/1991 | Lang et al. .................. 348/795 |
| 5,027,258 | * | 6/1991 | Schonigen et al. ............. 362/31 |
| 5,070,431 | * | 12/1991 | Kitazawa et al. .............. 362/31 |
| 5,083,120 | * | 1/1992 | Nelson ....................... 345/102 |
| 5,106,181 | * | 4/1992 | Rockwell, III ................ 385/116 |
| 5,128,842 | * | 7/1992 | Kenmochi .................... 362/31 |
| 5,160,921 | * | 11/1992 | Killinger ................. 340/815.42 |
| 5,278,545 | * | 1/1994 | Streck ....................... 345/102 |
| 5,414,599 | * | 5/1995 | Kaneko et al. ................ 362/31 |
| 5,428,365 | * | 6/1995 | Harris et al. ............. 340/815.42 |
| 5,453,855 | * | 9/1995 | Nakamura et al. .............. 349/58 |
| 5,532,711 | * | 7/1996 | Haris ..................... 340/815.42 |
| 5,542,016 | * | 7/1996 | Kaschke ...................... 362/32 |
| 5,579,134 | * | 11/1996 | Lemgyel ...................... 349/62 |

* cited by examiner

*Primary Examiner*—Steven J. Saras
*Assistant Examiner*—Paul A Bell

(57) ABSTRACT

In relation to a light emitting flat panel device used as a back light for monocolor or multicolor image display, or for illunmination or decoration uses, a very thin and low power consumed light emitting flat panel device (including uniform light emitting flat panel device) which able to emit monocolor or multicolor light from numerous dot type or line type light emission parts is offered in cheap price.

It is composed of an exterior board 1 integrated with multi or single light source (LED, etc.), light guide routes 2, light deviding routes 3, and dot type or line type light emittig parts 8, with optical scattered film 12 on front face of the light emitting flat panel of the said exterior board 1.

10 Claims, 3 Drawing Sheets

LIGHT EMITTING FLAT PANEL DEVICE WHICH USES LIGHT GUIDE ROUTES TO DIRECTLY SEND LIGHT INTO A MATRIX OF ELECTRONIC SHUTTERS

FIELD OF THE INVENTION

This invention relates to a light emitting flat panel device. This kind of flat panel device is used for a mono-color and/or multi-color image display device which is operated by electronic signal, and/or flat light source which emits uniform light. And more particularly, it relates to a light emitting flat panel device equipped with a plurality of dot light emitting parts which can be used as a back-light for a thin transit type monocolor and/or multi-color display device with electronic shutter board or film.

The electronic shutter has electrode matrix at each image element point on a transparent electrode panel as liquid crystal display. And also, this invention relates to mono-color or multi-color uniform light emitting flat panel device which can be used for illumination and/or decoration purposes.

BACKGROUND OF THE INVENTION

Light emitting flat panel devices have previously been proposed:

A. A device which has light scattering semi-transparent flat panel with fluorescent lamp at the backward or sideward of the panel has been used for mono-color and/or multi-color LCD devices. In this case, there are many problems on:

a. Thinness of the device is limited because there is a limitation to decrease diameter of fluorescent lamp.

b. Unsuitable for portable equipment because consumption of electric power of a fluorescent lamp is comparably large.

c. When the device is used for color display, it requires three kind of numerous color filters for each image element, because the fluorescent lamp emits mono-color. It means increase of manufacturing cost. In addition, since the color filter absorb much light power, intensity of fluorescent lamp must be increased, which means increase of electric power consumption.

B. Among other light emitting flat panel devices, there is a one using many side leak type optical fibers (Japanese Patent Application No. 86-68742, Japanese Patent Publication No.94-64272, Aug. 22, 1994). In this case, it requires complicated process as explained below, which invites increase of cost.

a. It needs a precision process which arranges many optical fibers at the very right position accurately.

b. It needs a precision process to make small holes of detailed dimensions and shapes on the accurate position on the side of each optical fiber.

c. It needs a sophisticated assembling process to bundle one end or both ends of optical fibers in group by color, which transport color light from each light source respectively.

SUMMARY OF THE INVENTION

The light emitting flat panel device of this invention can be used as a back light of image display device, or as an uniform light emitting flat panel device. The purpose of this invention is to solve problems occurred in previous devices, and to realize a light emitting flat panel which has the following progressed merits in comparison with the previous devices;

very thin type;
very bright because no filter is used;
low power consumption;
any size from small to large can be realized;
low manufacturing cost because of easy manufacturing process.

The First Invention

The dot type light emitting flat panel device of the first invention provides a thin and flat panel made of transparent material as plastics or glass. The flat panel integrates many light guide routes, several light dividing routes, and several LEDs in one body. And the panel emits numerous mono-color or multi-colors dot type of lights from the surface of the panel.

The light guide routes and the light dividing routes are made of a fine transparent cylindrical material which reflective index is respectively larger than that of the flat panel body. Therefore they guide the light with low loss. A number of light guide routes are placed in parallel and adjacent each other, inside but considerably near to the flat panel surface.

A light dividing route made of the same material with that of the light guide route has several smaller branches in one side and one bigger branch in the opposite side. Each small branch becomes to each light guide route, and a LED is placed at the end of a bigger branch. In order to be emitted a number of dot lights from one side of the flat panel, lots of small holes are provided at even intervals on the flat panel alongside the light guide routes.

The form and dimensions of the small holes shall be appropriate ones. When it is necessary, each small hole can be filled up with the same material to the light guide routes and light dividing routes, or each lens can be provided in each light emitting part. By the method stated above, an integrated one-body light emitting flat panel device with lots of dot light emitting points is constructed, and light from one LED light source can be thrown into plural light guides routes in parallel. Such an integrated flat panel can be easily mass-produced by plastic injection mold process or similar, and not require a complicated and precise process required hitherto. Therefor, a drastic cut of production cost can be realized.

By providing a thin panel or film type electronic shutter which has many small electronic shutters on the light emitting face of the panel, and according strictly each small shutter position to each light emitting point, then controlling each shutter by electronic signal, a picture image can be displayed through the electronic shutter panel or film.

The picture can be displayed in multi-color, when three primary color LEDs (Red, Green, and Blue) are used as the source of light. By using LEDs, the device will be thinner and lower in power consumption comparing with using of fluorescent lamp. Besides, the color filter which required in former technology is not necessary. A lot of merits including saving production cost will be obtained. As for electronic shutter, the existing liquid crystal shutter for mono-color display use can be used for multi-color by using the light emitting flat panel of this invention. However, a high dielectric crystal film is recommended by the inventor of this invention, considering easy process for thin and large size, rapid response speed, low cost etc. When the light guide routes and the light dividing routes are made of elbium or any other material which becomes light amplification medium, they can be composed of the light amplification routes. By this method, intensity of light source can be decreased.

The Second Invention

Instead of the electronic shutter stated in the above paragraphs, when a light scattering film like Japanese Washi paper or similar material is placed in face of the flat panel, a uniform light emitting flat panel device is obtainable. In this case, it is easy to get any voluntary color-tone and brightness of flat light source by switching or adjusting brightness of each LED individually. When higher brightness is required, a higher power lamp such as halogen lamp can be used instead of LED. Those uniformed light emitting flat panel devices will be widely used for illumination, decoration etc.

The Third Invention

For the uniformed light emitting flat panel devices, the other methods than making small holes stated in the first invention are considered. By making line type ditch on the surface of one side or two sides of the flat panel alongside the light guide routes, light can be emitted in line from one side or two sides of the flat panel. Or instead of making ditch stated above, by placing the light guide routes near to the surface of the flat panel, or by placing them as the part of light guide routes be exposed on the surface of the panel, light will be emitted in line form, too.

By means of present invention as mentioned above, many problems contained in the hitherto technology can be solved, and new picture image display devices and flat panel lightning devices with the following merits can be realized;

High brightness;

Large size;

Thinner size;

Lower production cost;

Lower power consumption.

BRIEF DESCRIPTION OF THE DRAWINGS

The invention disclosed herein will be understood better with reference to the following drawings of which.

DETAILED DESCRIPTION OF PREFERRED EMBODIMENT OF THE INVENTION

Figure 1:
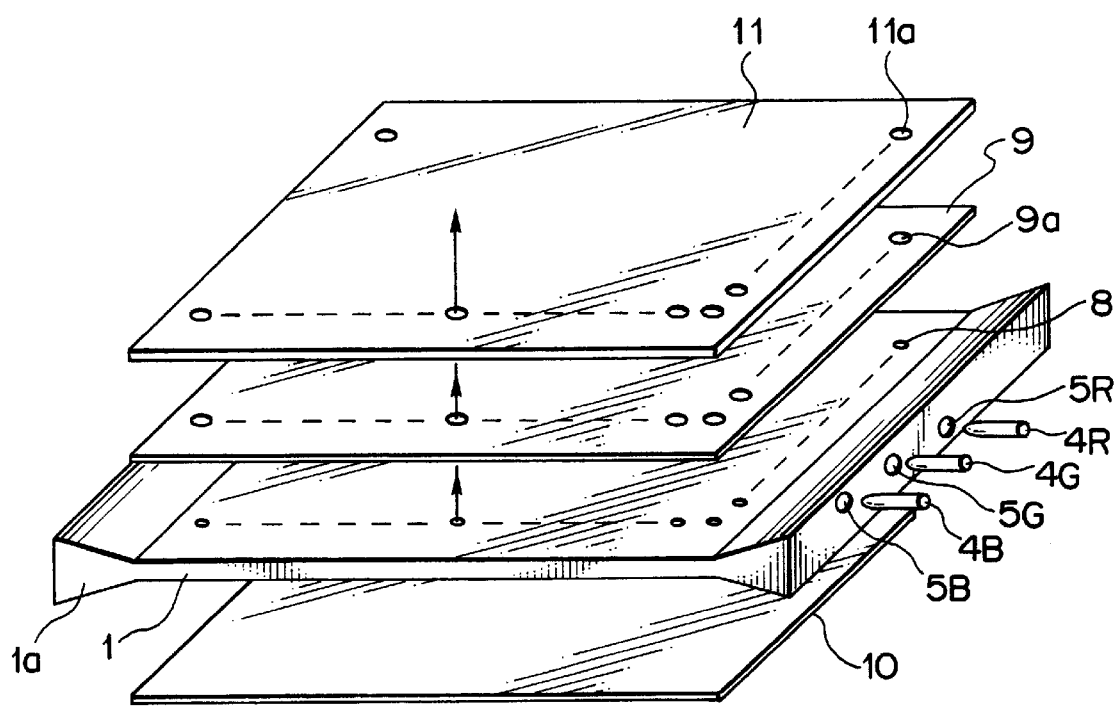
FIG. 1 is an exploded view in perspective of a color display device embodying the invention.
Figure 2:
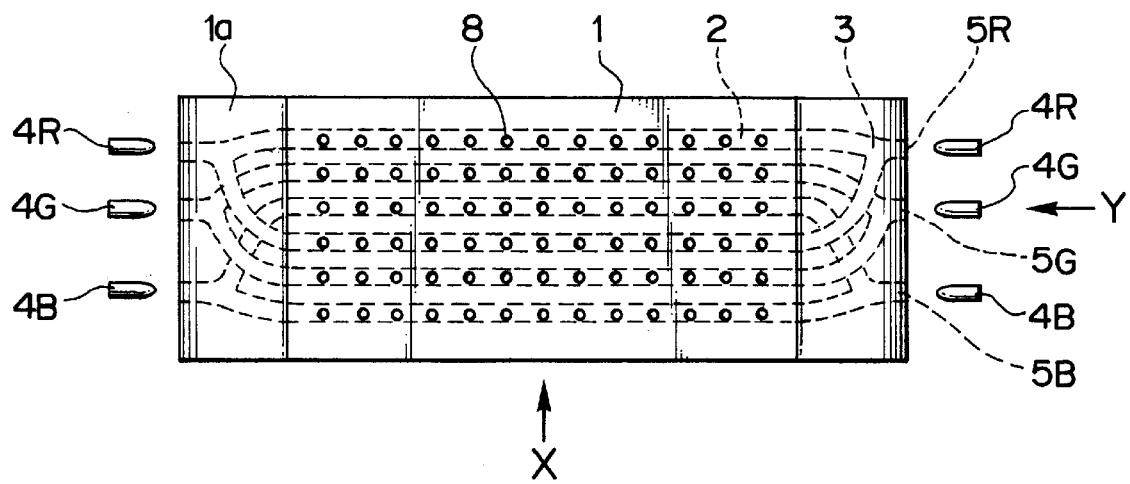
FIG. 2 is a plane view of a dot light emitting flat panel embodying the invention with light guide routes, the light dividing routes and LEDs.
Figure 3:
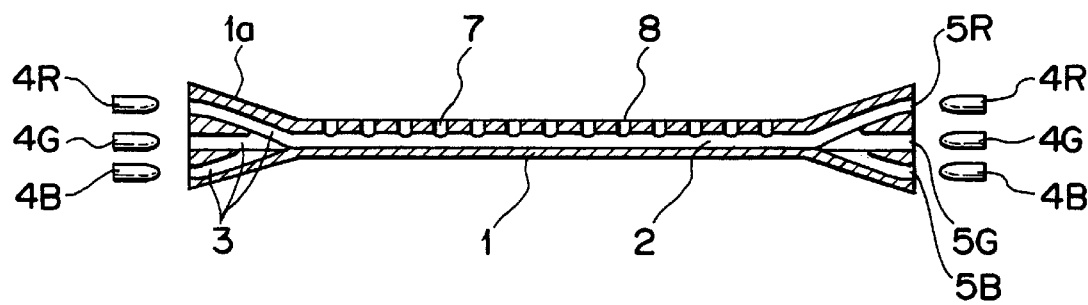
FIG. 3 is a sectional view of a dot light emitting flat panel embodying the invention with light guide routes, light dividing routes, and LEDs.
Figure 4:
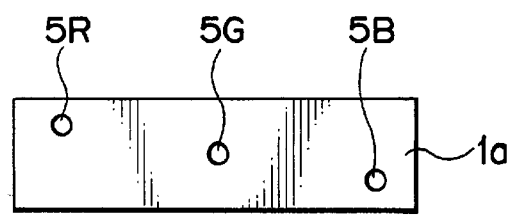
FIG. 4 is a side view of a dot light emitting flat panel embodying the invention with ends of light guide routes.

From FIG. 1 to FIG. 4, they show the first example of this invention. Inside the exterior board 1, which is made of transparent material of relatively smaller refractive index, numbers of cylindrical light guide routes 2, which are made of transparent material of relatively larger refractive index, are provided in parallel. The terminal ends of several light guide routes 2 become to branch type light dividing routes 3 made of the same material with that of the light guide routes, and the branch type light dividing routes 3 are separately provided in three dimensional form and in the minimum distance not to make optical interference mutually at the inside of the terminal 1a of the exterior board 1.

At the terminals of the light dividing routes 3, LEDs 4R, 4G and 4B are provided respectively. Along the longitudinal direction of the light guide routes 2, numbers of light emitting small holes 7 are divided. The light emitting small holes 7 are cut small holes, or cut small holes filled with the same material with that of the light guide routes 2. The top end of each holes 7 composes dot type light emitting part 8 on the light emitting surface of the exterior board 1.

In addition, on the front side of the exterior board 1, an electric shutter board or film 11 and a shield film 9 are placed. The electric shutter board or film 11 is composed with numbers of small electric shutters 11a, and shield film 9 makes a black matrix film with penetration holes 9a. On the other hand, a light reflection film 10 which consists of aluminium film or another material is provided on the rear side of the exterior board 1.

The position of the dot type light emitting part 8, the penetration hole 9a, and small electric shutters 11a are corresponding each other. In the composition stated above, when three primary colors of additive mixture of color stimuli, red, green and blue coming out from, LED 4R, 4G and 4B and enter into the sides 5R, 5G and 5B respectively of the light dividing routes 3, parts of the colors come out from the dot type light emitting parts 8, pass through the penetration holes 9a. and reach the small electronic shutters 11a, Then, by controlling each small electronic shutter 11a, any voluntary color image can be displayed. At this stage, the shading 9 absorbs unnecessary scattered light and becomes as the material to improve the picture quality. It is possible to unify the volume of passing light by adjusting the dimension of the penetration hole 9a. The light reflection film 10 reflects the leaking light to the rear side of the exterior board 1 and becomes as a material to use light efficiently. The above mentioned two materials 9 and 10 are used if necessary.

By selecting section size of light dividing routes 7, or curved surface of terminal side (at the dot type light emitting parts 8), or by adding lens, it is possible to adjust amount of discharge and focusing of the lights. It is easy to obtain a high bright panel emission device by selecting number of light dividing route and light sources, or by adopting high intensity light source.

Figure 5:
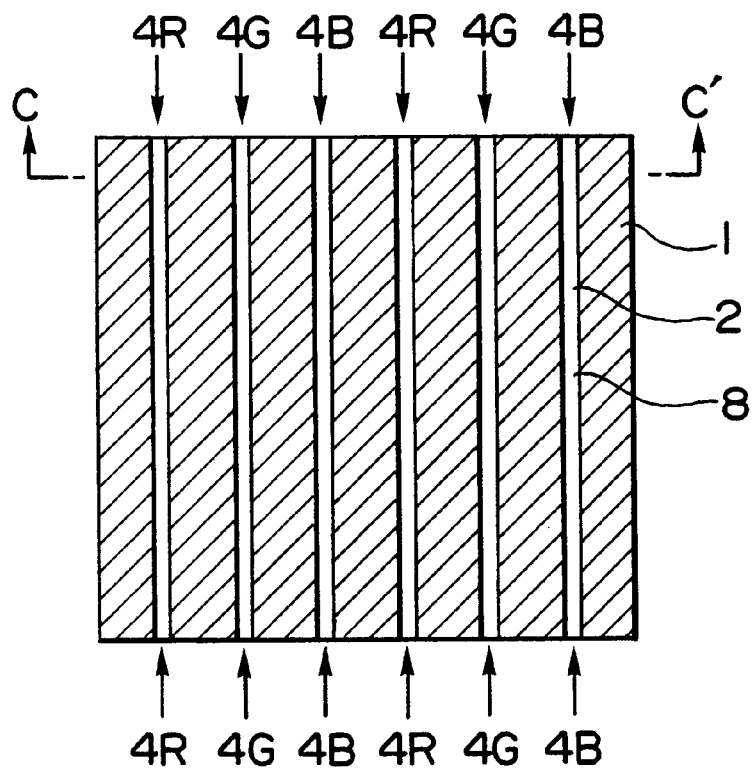
FIG. 5 is a plane view of a line light emitting flat panel embodying the invention with light guide routes, without light dividing routes and LEDs.
Figure 6:
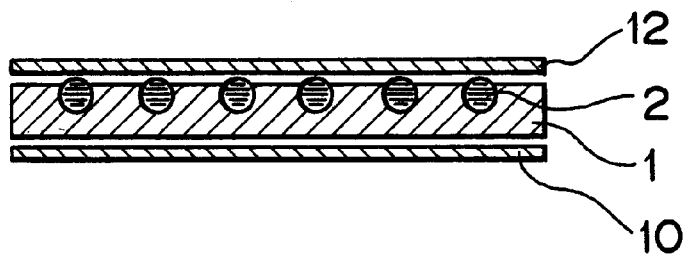
FIG. 6 is a section seen in the plane of lines C–C' of FIG. 5 with a flat panel, light guide routes, a reflector and a light scattering film.

In FIG. 5 and FIG. 6, a side part of the light guide routes 2 is exposed to light emission face of exterior board 1, and composes the line type light emitting panel. An optical scattered film 12 and a light reflection film 10 are arranged on the front and the rear side of the exterior board 1 respectively. In this composition, when red light 4R, green light 4G, and blue light 4B is entered, the light emitted from line type light emitting parts 8 becomes scattered mixture by optical scattered film 12.

At this time, by adjusting amount of each light independently, any voluntary color and/or brightness can be obtained. It is of course obtainable a uniformed plane light emission face, when white or any other mono-color light is put to all light guide routes 2. The basic component element of the panel device made by this invention is a thin exterior board 1 which includes light guide routes 2 integrally and provide light emission parts 8. Then, manufacturing process of this system is very simple and suitable for mass production, so it is easy to lower the cost of the device. It is possible to contribute to the decrease of power consumption and to make the device thin by using high intensity LED as light sources.

When the panel emission system made by this invention is used as the back light of a transparent flat display system which has electronic shutters arranged in matrix corresponding to each picture element, it contributes to make the total systems thin, increase brightness and decrease power consumption.

In case of a color display, color filters used at the position of each picture element in hitherto technology become unnecessary, so it also contribute to reduction of price. Moreover, it also eliminates filter penetration loss which is tens percent at present technology, so that can reduce the volume of light source and obtain an advantage of reducing power consumption.

In addition, a light emitting flat panel made by using present invention can be as a substitution of white back light presently used for a liquid crystal display. It is also possible to be used as a panel light source for illumination and decoration purposes. As stated above, the utilization field of this invention is very wide, and the effectiveness of this invention is extremely large.

Having thus described the invention, what is claimed is:

1. A light emitting flat panel device comprising:
   (a) plural light guide routes made of a fine transparent cylindrical material having refractive index larger than that of a flat panel body, and placed inside the flat panel body, wherein said light guide routes are made of separate cylindrical fine threads or columns of a fixed shape in any cross sections perpendicular to the path of the light as a means to directly channel the light across the flat panel.
   (b) a light dividing route made of the same material to that of the light guide routes, having several branches leading to said light guide routes and another branch leading to source of light, and placed inside the flat panel body,
   (c) a flat panel body made of transparent material, provided plural small holes on light emitting side, alongside said light guide routes for dot light emitting points,
   (d) a thin panel or film type electric shutter having matrix of plural small electric shutter elements exactly placed at each position of said light emitting points and individually controlled by electric signal.

2. A light emitting flat panel device according to claim 1, wherein said small holes are filled up with same material to the light guide routes.

3. A light emitting flat panel device according to claim 1 or claim 2, wherein said light guide routes and said light dividing route are made of a material enabling the light to be amplified.

4. A light emitting flat panel device according to claim 1 or claim 2, wherein said small holes provided at even intervals on the flat panel body.

5. A light emitting flat panel device according to claim 1 or claim 2, wherein each said small hole is provided by lens.

6. A light emitting flat panel device according to claim 1 or claim 2, wherein said electric shutter is made use of liquid crystal film of dielectric.

7. A light emitting flat panel device according to claim 6, wherein the small holes are filled up with same material to the light guide routes.

8. A light emitting flat panel device according to claim 1 or claim 2, wherein said plural light guide routes are placed in parallel and adjacent each other inside the plat panel body.

9. A light emitting flat panel device comprising:
   (a) plural light guide routes made of a fine transparent cylindrical material having refractive index larger than that of a flat panel body, and placed inside the flat panel body, wherein said light guide routes are made of separate cylindrical fine threads or columns of a fixed shape in any cross sections perpendicular to the path of the light as a means to directly channel the light across the flat panel,
   (b) a light dividing route made of the same material to that of the light guide routes, having several branches leading to said light guide routes and another branch leading to source of light, and placed inside the flat panel body,
   (c) a flat panel body made of transparent material, provided plural small holes on light emitting side, alongside said light guide routes for dot light emitting points,
   (e) a light scattering film is placed in face of the flat panel body in order to obtain an uniform light emitting flat panel device,
   (f) a means switching or adjusting brightness of the source of light in order to get and voluntary colourtone and brightness.

10. A light emitting flat panel device comprising:
   (a) plural light guide routes made of a fine transparent cylindrical material having refractive index larger than that of a flat panel body, and placed inside the flat panel body, wherein said light guide routes are made of separate cylindrical fine threads or columns of a fixed shape in any cross sections perpendicular to the path of the light as a means to directly channel the light across the flat panel,
   (b) a light dividing route made of the same material to that of the light guide routes, having several branches leading to said light guide routes and another branch leading to source of light, and placed inside the flat panel body,
   (g) a flat panel body made from transparent material and made line type ditch alongside the light guide routes on one or two sides.

* * * * *